United States Patent [19]

O'Neill et al.

[11] 3,737,861

[45] June 5, 1973

[54] INPUT/OUTPUT BUS

[75] Inventors: William F. O'Neill; Farid J. Neema, both of San Diego, Calif.; Edward P. Hopey, Chelmsford, Mass.

[73] Assignee: Honeywell Inc., Minneapolis, Minn.

[22] Filed: Apr. 1, 1970

[21] Appl. No.: 24,771

[52] U.S. Cl. ............................................340/172.5

[51] Int. Cl. ............................................G06f 3/04

[58] Field of Search ..................................340/172.5

[56] References Cited

UNITED STATES PATENTS

| | | | |
|---|---|---|---|
| 3,200,380 | 8/1965 | MacDonald et al. | 340/172.5 |
| 3,274,561 | 9/1966 | Hallman et al. | 340/172.5 |
| 3,360,781 | 12/1967 | Roehnke et al. | 340/172.5 |
| 3,297,996 | 1/1967 | Grady | 340/172.5 |
| 3,303,476 | 2/1967 | Moyer et al. | 340/172.5 |
| 3,432,813 | 3/1969 | Annunziata | 340/172.5 |

*Primary Examiner*—Paul J. Henon
*Assistant Examiner*—John P. Vanderburg
*Attorney*—Fred Jacob and Leo Stanger

[57] ABSTRACT

A data processing system having a central control unit and an input-output bus connecting the central control unit with one or more of a plurality of peripheral devices which may include a magnetic tape unit and a keyboard. The input-output bus contains a group of bidirectional multifunction lines and a second group of control lines which form an array, the intersections of which control transmission of data or commands across the input-output bus.

21 Claims, 26 Drawing Figures

Patented June 5, 1973 3,737,861

15 Sheets-Sheet 1

INVENTORS
WILLIAM F. O'NEILL
FARID J. NEEMA
EDWARD P. HOPEY

BY [signature]
ATTORNEY

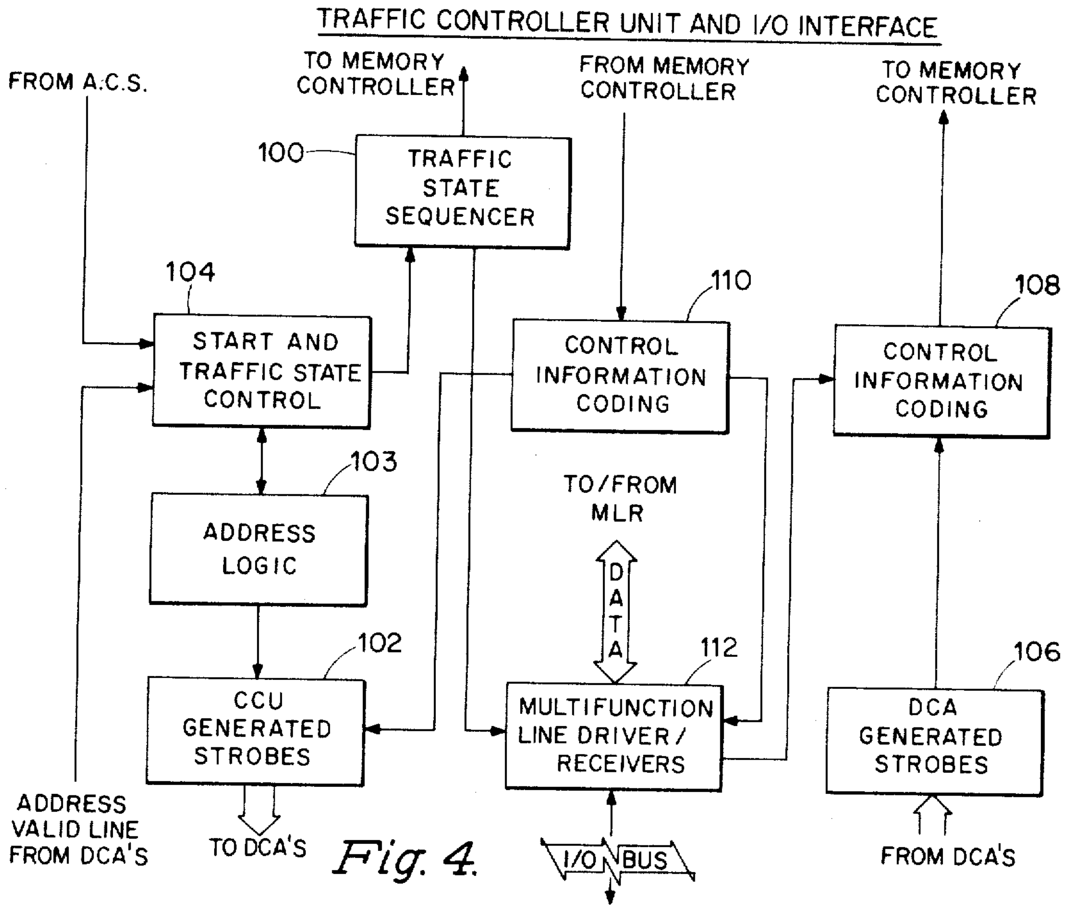

Fig. 4.

TRAFFIC STATE APPLICATIONS

| MODE OF OPERATION | TS1 | TS2 | TS3 | TS4 | ORDER OF USE |
|---|---|---|---|---|---|
| PROGRAM ENTRY | XNU | KEY PROGRAM BITS INTO MEMORY | XNU | XNU | TS2 |
| PROGRAM VERIFY | XNU | KEY IN SOURCE PROGRAM BITS AND COMPARE | XNU | XNU | TS2 |
| DATA ENTRY | XNU | KEY DATA BITS IN MEMORY | XNU | WRITE DATA ONTO TAPE READ AND COMPARE | TS2, TS3, TS4 |
| DATA VERIFY | READ RECORD | KEY IN SOURCE DATA BITS AND COMPARE | XNU | USED TO CORRECT FIELD AND CHARACTER | TS1, TS2 |
| SEARCH | READ RECORDS IN FROM-TAPE COMPARE WITH RECORD IDENTIFIER | KEY IN RECORD IDENTIFIER | XNU | XNU | TS2,TS3, TS4,TS1 |

Fig. 5.

TRAFFIC STATE DATA PATH

| 1 | 2 | 3 | 4 |
|---|---|---|---|
| A | A AND/OR C | A AND/OR B AND/OR C | B |
| TAPE IN | KEYBOARD IN | PAGE PRINTER OUT | TAPE OUT |
| CARD READER IN | COMMU-NICATIONS IN | BUFFERED LINE PRINTER OUT | COMMU-NICATIONS OUT |
| PAPER TAPE READER IN | | | PAPER TAPE PUNCH OUT |

Fig. 6.

I/O BUS

| | FUNCTION LINE | BIS | ADS | OPG OPS-$\overline{OCS}$ | OCG $\overline{OPS}$-OCS | IPG IPS-$\overline{ICS}$ | ICG $\overline{IPS}$-ICS | OCD OPS-OCS | ICD IPS-ICS |
|---|---|---|---|---|---|---|---|---|---|
| | | STROBE LINES | | | | | | | |
| MULTI-FUNCTION LINES | F01 | DATA | AD1 | PB1 | TMD | PRQ | ERR | | TBS |
| | F02 | DATA | AD2 | PB2 | TRB | IDP | MIN | | TEF |
| | F03 | DATA | AD3 | PB3 | EOD | ALP | MDC | | |
| | F04 | DATA | AD4 | PB4 | TAK | BUR | DUP | | |
| | F05 | DATA | | PB5 | | VER | SKP | | |
| | F06 | DATA | | PRL | | AGN | LZK | | |
| | F07 | DATA | | TER1 | | ISP | TMW | | |
| | F08 | DATA | | TER2 | | ILZ | REW | | |
| | F09 | DATA | TMF | ERO | | | RLK | | |

| | FUNCTION LINE | | |
|---|---|---|---|
| SINGLE FUNCTION LINES | ADV | ADDRESS VALID | (DCA → CCU) |
| | INT | INITIALIZE | (CCU → DCA) |
| | PDA | COMMON TIMING | (CCU → DCA) |
| | D1T | DEVICE TRANSMIT | (DCA → CCU) |
| | D1R | DEVICE RECEIVE | (DCA → CCU) |
| | DIN | DEVICE INITIALIZE | (DCA → CCU) |
| | TSM | TRAFFIC STATE MODIFY | (DCA → CCU) |
| | HSC | HIGH SPEED COMMUNICATOR | (DCA → CCU) |
| | WMD | CCU IN WRITE MODE | (CCU → DCA) |
| | VMD | CCU IN VERIFY | (CCU → DCA) |

Fig. 8.

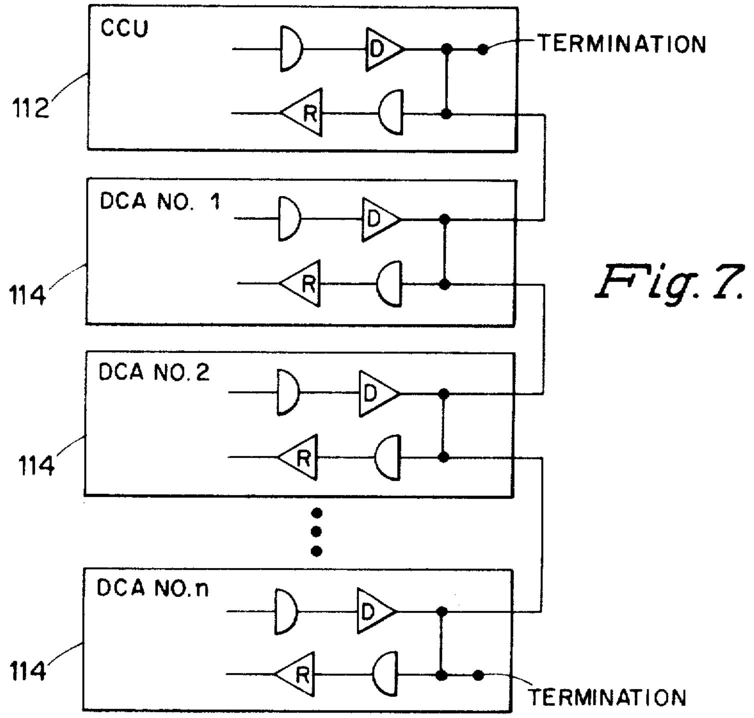

Fig. 7.

OUTPUT INFORMATION STROBE (B15)
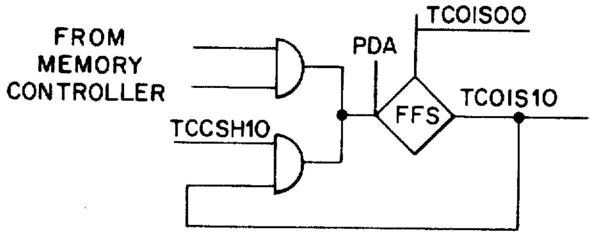
Fig. 11B.
CONTROL STROBES HOLD
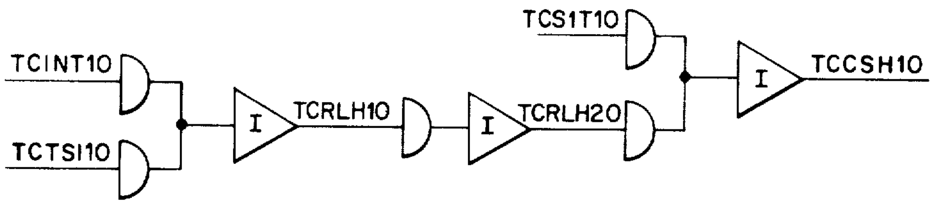
Fig. 11C.
OUTPUT PROGRAM STROBE
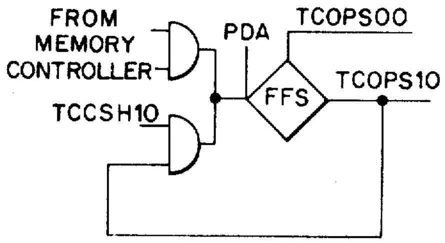
OUTPUT CONTROL STROBE
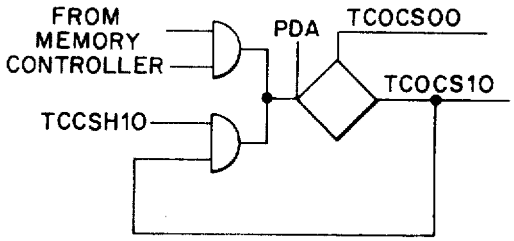
Fig. 11D. Fig. 11E.

INPUT/OUTPUT BUS

BACKGROUND OF THE INVENTION

1. Field of the Invention

This invention generally relates to keyboard to magnetic tape data processing units used in the preparation of data from source documents to computer compatible magnetic tape.

More particularly, the invention relates to a keyboard to magnetic tape unit which is expandable to permit attachment of a variety of peripheral input-output equipment through a bidirectional multifunction input-output line forming a matrix or array for control of, and transmission of data between, a central control unit and a plurality of peripheral attachments.

2. Description of the Prior Art

Devices are known which utilize a keyboard to key characters into a memory to be subsequently written on computer compatible magnetic tape. The device has the capability of operating in entry or verify modes during which data is entered via a keyboard into a buffer memory and then recorded on magnetic tape; or digital information recorded on magnetic tape is read back into buffer memory and compared with characters entered on a keyboard, respectively.

The device, however, does not have the capability of additional data transmission between the central control unit thereof and peripheral devices external to the key-to-tape unit via an input/output bus compatible with a variety of attachments.

It is further known in the art of data processing to transmit data, via an input-output bus, to various types of peripheral equipment external to the central processor of the data processing system.

One such input-output bus is known as a "daisy-chain" bus containing a plurality of lines, a number of which are used for data, the remainder of which are used to transmit control signals between the peripheral control units (PCU's) and the central processor. Generally, in this type of bus, the information lines and control lines are unidirectional, thus requiring a separate set of data lines from the peripheral control units to the central processor and from the central processor to the PCU.

Furthermore, the busses are usually "time" busses in which a clock signal, originating in the central processor is sent down the line along with the address, control or data signals, and all PCU's use this timing information in conjunction with the received data and control to operate their internal logic synchronously with respect to the central processor and the bus, and to generate proper responses to the central processor transmissions.

Furthermore, each PCU is usually given a specific address. The number of PCU's that can be attached to the I/O bus at any one time m is smaller than the total number of PCU's available M. Also, the number of traffic states S is usually smaller than *m*. It therefore usually requires a significant amount of hardware at either the control unit end or the peripheral control unit end or both in order to relate a traffic state to a given device or PCU and to decode the address.

SUMMARY OF THE INVENTION

Briefly, the invention herein disclosed comprises an expanded keyboard-to-magnetic tape system capable of operating in a plurality of modes for entering program and data, verifying program and data and for searching records on magnetic tape, as well as an input-output bus containing information signal wires and control signal wires which form an array transmission of data, program or control information between a central control unit (CCU), and one or more of a plurality of input-output device control area units (DCA). The control of the flow of control and data information is accomplished in a portion of the CCU containing an I/O interface, a traffic controller and an I/O bus, which bus terminates at an interface associated with each DCA.

The traffic controller is capable of operating in a plurality of traffic states, each traffic state defining a permissible class of operations to be transmitted across the I/O bus between the CCU and DCA, each traffic state always addressing the same plurality of devices.

OBJECTS

It is an object, therefore, of the instant invention to provide an improved data processing system for preparation and transmission of data.

It is a further object of the invention to provide an improved input-output bus system for transmission of data between a central control unit and a plurality of device control area units.

A further object of the invention is to provide an improved traffic control unit for efficiently transmitting data and/or commands across an input-output bus.

Other objects and advantages of the invention will become apparent from the following description of a preferred embodiment of the invention when read in conjunction with the drawings contained herewith.

BRIEF DESCRIPTION OF THE DRAWINGS

FIG. 4 is a block diagram of the Traffic Controller Unit and Input/Output Interface.

FIG. 5 is a table of Traffic State Sequences and Operations for the Keyboard and Tape Units.

FIG. 6 is a table of Traffic State Operations with typical input/output devices.

FIG. 7 is a schematic representation of the bus drivers-receivers and the terminations therefor.

FIG. 8 is a table showing the I/O bus control and multifunction lines and the single function lines, the control and multifunction lines forming an array.

FIGS. 11A to 11E are logic block diagrams of the central control unit timing and strobe generation.

DESCRIPTION OF THE PREFERRED EMBODIMENT

General

Figure 1:
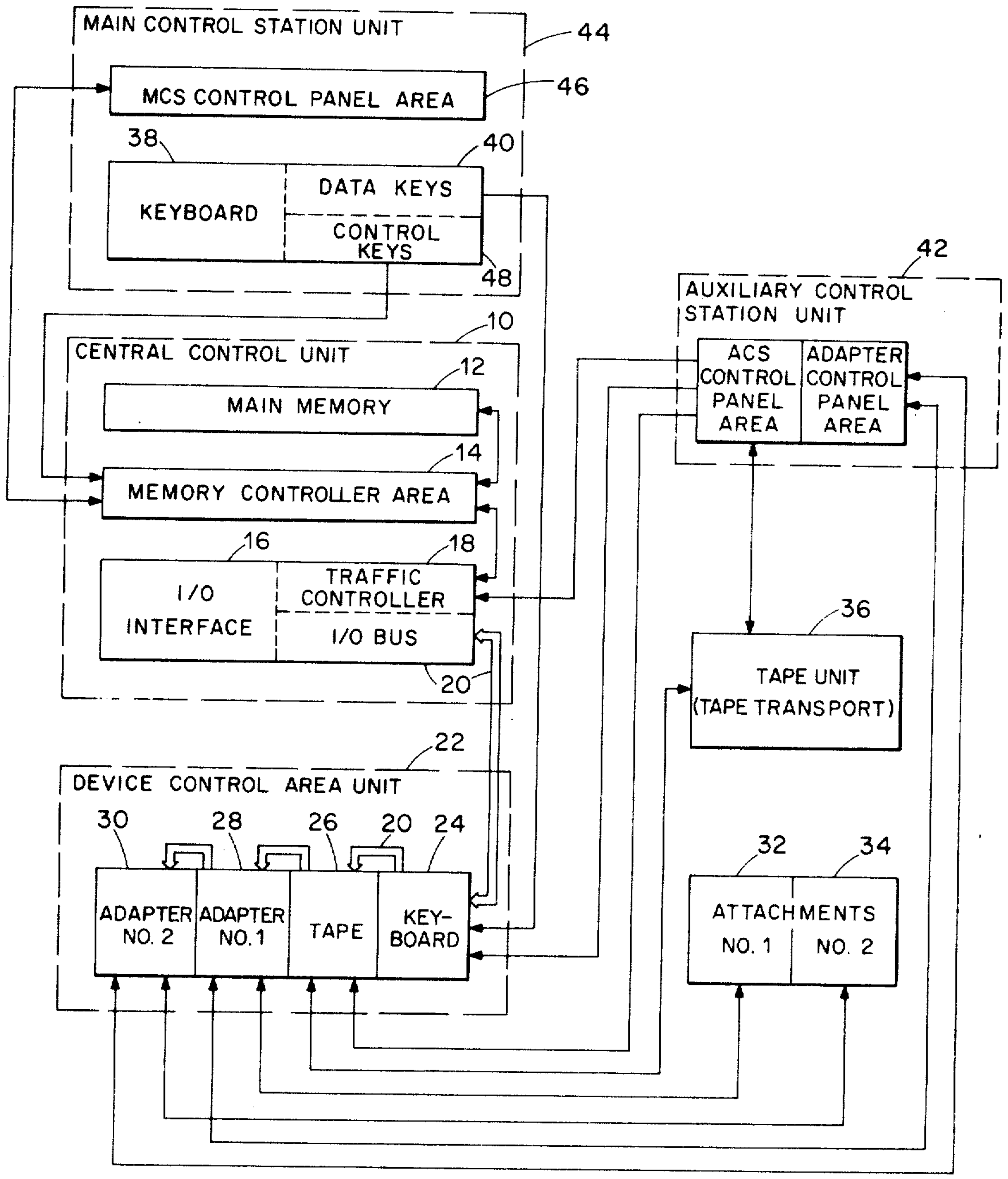
FIG. 1 is a block diagram of the overall expanded system of the invention.

In a basic key-to-tape device, operation may be accomplished in any one of a plurality of modes. Commonly available modes of operation are Program Entry, Program Verify, Data Entry, Data Verify and Search. In such devices, a buffer memory, which may be a core memory of fixed length is used to buffer data between the keyboard and the file memory or magnetic tape storage medium. Program and/or data information must pass through the buffer memory during each of the operations named above. Such a core memory may have, for example, 21 bits per column and 90 columns. A typical record length is 80 characters, the remaining 10 columns of core being used for longitudinal parity and cyclical redundancy checking. In each column comprising 21 cores or bits, 5 bits may be used for a first program, 5 bits for a second program, 8 bits for data, 1 bit for data parity, 1 bit for duplication (duplify bit), and 1 bit for program parity. Obviously these figures are only exemplary and the memory may be of any convenient size or configuration. For example, a 7-track system may have only 6 data bits per character instead of the 8 normally used in 9-track systems.

The machine may operate under no program control or under the control of either a first or second program, the state of program control being operator selectable by means of a switch on the keyboard control panel.

As previously indicated, such a device may operate in any one of five selectable modes, the modes being selectable by the operator through a five position switch on the keyboard control panel.

In the program entry mode, the program selection switch will be positioned at the first or second program position. The program information is then entered via the keyboard and stored in buffer memory until a complete record (80 characters) is written (the 80 character memory is common, it being derived from the analogous use of 80 column Hollorith punched cards.)

In program verify mode, the operator rekeys the program information, beginning from column 1, and the program bits are compared, bit-by-bit, with the program stored in buffer memory. If an error occurs due to a non-comparison of bits, an alarm is activated to inform the operator of such error.

In data entry mode, the operator selects the program status by means of the program selection switch and begins keying in data from source materials. The data is stored in buffer memory along with a parity bit which has been generated for each data character. At the beginning of the operation, the program in column 1 is extracted and decoded so that the key stroke may be interpreted as the selected character. The character is then stored in buffer memory, and the program information from column 2 is extracted and a second key stroke is made. This continues sequentially through the record until the 80th character is entered into memory, at which time the operator strikes a release key (REL), and the data is transferred from buffer memory onto magnetic tape. The data positions of the core memory are non-destructively read onto the tape, or are immediately refreshed with the same information read on tape. The tape unit then backspaces one record length and reads the data just written back, where it is compared with the data in buffer memory. If an error exists, an indication of such error is given.

In data verify mode, a record is read from tape into buffer memory, and the operator rekeys the information previously recorded. The data is compared bit-by-bit with that stored in buffer memory, and an error will give a suitable indication.

In search mode, an identifier is keyed into buffer memory. The identifier may be of any length, and the remaining character positions in buffer memory will be filled with blanks, which are ignored in the comparison operation. The records on tape are then sequentially read back and compared with the identifier in buffer memory and when a positive comparison is found, the tape stops at an interrecord gap following the desired record.

With such a device, a number of automatic operations are possible such as Skip and Duplify which will pass by memory positions in which data is to remain constant from record to record. Such functions are disclosed in co-pending applications, Ser. No. 777,442 filed Nov. 20, 1968 now U.S. Pat. No. 3,581,285, and Ser. No. 777,409 filed Nov. 20, 1968, now U.S. Pat. No. 3,575,589, and assigned to the assignee of the instant invention.

It should be apparent that, with such a machine, all timing is internal and all control is internal to the device. When additional peripheral attachments are included, however, the timing becomes more complex, and more elaborate sequencing and control are required. In the instant device, the keyboard and tape units are treated as peripheral devices, along with various other peripheral attachments.

OVERALL DESCRIPTION OF THE EXPANDED SYSTEM

FIG. 1 is a block diagram of the overall expanded system which includes a central control unit (CCU) 10 containing a main memory 12, a memory controller 14 and an I/O interface 16 which has a traffic controller 18 and an I/O bus portion 20. The I/O bus is connected to a device control area unit 22, and is daisy-chained from a keyboard device control area unit (DCA) 24 to a tape DCA 26, a first adapter 28, and a second adapter 30. The first and second adapters 28 and 30 provide interfaces between the I/O bus and peripheral attachments 32 and 34 which may be input or output devices such as a card reader, a paper tape reader, a communications device, a printer or a paper tape punch. Obviously other attachments may be used, the foregoing being merely examples of possible peripheral attachments.

The tape DCA 26 is connected to the tape transport unit 36 and the keyboard DCA is connected to the keyboard 38, and more particularly to the data key portion 40 of the keyboard. All the device control area units are connected to an auxiliary control station unit 42 which provides controls to be later described.

The system also includes a main control station unit 44 of which the keyboard 38 is a portion and which contains a separate control panel 46. The keyboard 38 also contains a plurality of control keys 48 which are connected to the memory controller area 14.

In general, therefore, the system comprises the following major units: Main Control Station Unit, Central Control Unit, Device Control Unit, Auxiliary Control Station Unit, Tape Unit and Attachments.

The main control station unit consists of the main control station control panel and the keyboard area unit. The MCS control panel receives system status information from the memory controller in the central control unit. Monitor data may be visually displayed by the MCS control panel indicators. In the keyboard area unit, when one of the control keys is depressed, a signal is sent to the memory controller. This signal implements the device control operations. An activated data key supplied a signal to the keyboard DCA.

The central control unit has a main memory, a memory controller, an I/O interface and a traffic controller.

The main memory may include a magnetic core portion as previously described, a memory local register, timing and access counters and parity generation and check circuits and logic. The magnetic core memory stores program and data information as previously described. Input data to the magnetic core memory comes from the memory controller. Memory output is fed to the memory controller for ultimate transfer to the DCA. The memory controller contains automatic operation, major cycle control, and memory parity error logic. Device control signals are received from the keyboard control keys. The memory controller sends information to the foregoing areas, system status to the MCS control, input and output data to main memory and instructions to the traffic controller.

The I/O interface consists of the traffic controller and the I/O bus. The I/O bus is the communication medium connecting the central control unit and the device control area units. The traffic controller contains traffic state generation logic and the CCU-I/O bus interface. DCA addressing signals are correlated by the traffic controller into a correct sequence of memory controller cycles.

The device control unit provides a synchronous interface between the CCU and the area units controlled by the traffic controller (i.e. keyboard, tape transport and adapters). The DCA keyboard area unit receives data key input signals. These signals are transferred from the DCA to the I/O bus. The keyboard DCA obtains control instructions from the auxiliary control panel.

The tape section of the DCA contains tape write logic and drive, check and motion logic for the tape transport. The Device Control Area unit 26 is the input/output interface for the tape unit. The tape DCA also receives control signals from the ACS control panel.

The adapter DCA's interface with adapters connected to the system. The DCA accepts control signals from the adapter control panel.

The auxiliary control station unit consists of the auxiliary control station control panel and the adapter control panel. The ACS control panel provides control signals to the traffic controller, the keyboard DCA or the tape DCA. The tape unit also interfaces directly with the ACS control panel.

The tape unit consists of a tape transport and interfaces with the ACS control panel. The tape unit receives information to be written on tape from the tape section of the DCA. Data read from tape is supplied to the tape DCA and is then transferred to the I/O bus.

MAIN MEMORY UNIT

Figure 2:
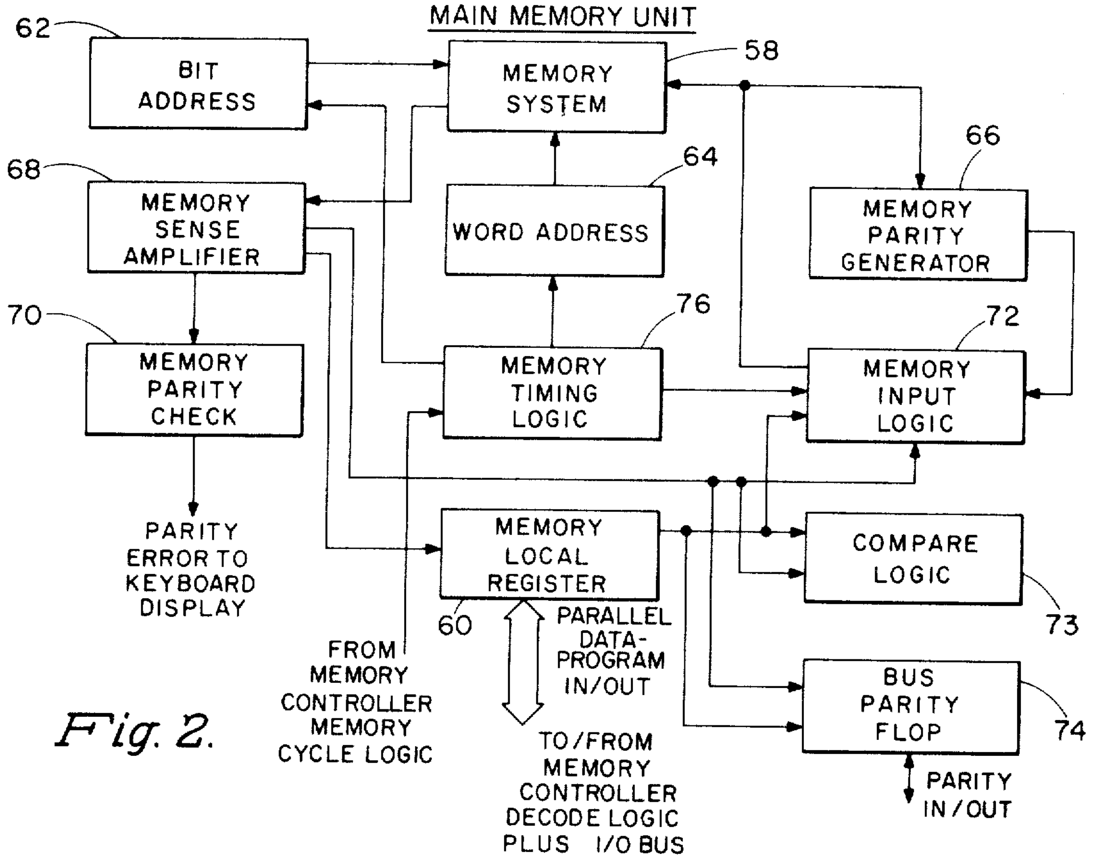
FIG. 2 is a block diagram of the Main Memory Unit of the invention.

FIG. 2 shows a detailed logic block diagram of the Main Memory Unit. All data being either put into the memory or extracted from the memory passes through the Memory Local Register (MLR) 60 which may be one character in length. The particular memory bits (program or data) and memory word to be cycled are controlled by the bit and word address counters 62 and 64 respectively. These may be sequential counters which are incremented or decremented as the system sequences through a given operation. The bit counter 62 increments on each memory write cycle (WRC), and the word counter may increment/decrement upon completion of an operation on any word (either data or program).

When an input operation is begun, data is placed in the MLR 60 in parallel by a strobe which begins the overall memory timing. Successive read (RDC) and write (WRC) cycles then cause the MLR data to be shifted serially into the memory. Memory parity is computed in the memory parity generator 66 and is then placed in the appropriate memory location. As the MLR data is being shifted into memory on each WRC, the former contents of memory are being shifted out at RDC through memory sense amplifier 68. Memory parity is checked in parity checker 70 on the data being output from memory and will indicate a memory parity error if incorrect. The previous contents of the memory are shifted into the MLR where it is usually ignored.

Compare logic 73 is used in the data verify and search operations to provide a bit-by-bit comparison between data entered from the keyboard and data being extracted from the memory.

A memory output operation works in basically the same manner, except that the data being read from memory on RDC is fed directly back into memory through the memory input logic 72 as it is placed in the MLR. Memory parity is again both generated and checked. When a memory output operation is finished, the extracted character is in the MLR and is ready to be placed on the I/O bus. I/O bus parity is also computed in bus parity flop 74 as the data is placed in the MLR.

The memory timing logic is controlled by the memory controller from a clock utilizing an oscillator and synchronous flip-flop. The memory 58 itself may be, by way of example, a coincident current, magnetic core, serial access memory. The driving and sensing circuitry may be conventional, as may be the addressing. A typical memory may be 200 characters in length, each character being 21 bits long.

MEMORY CONTROL UNIT

Figure 3:
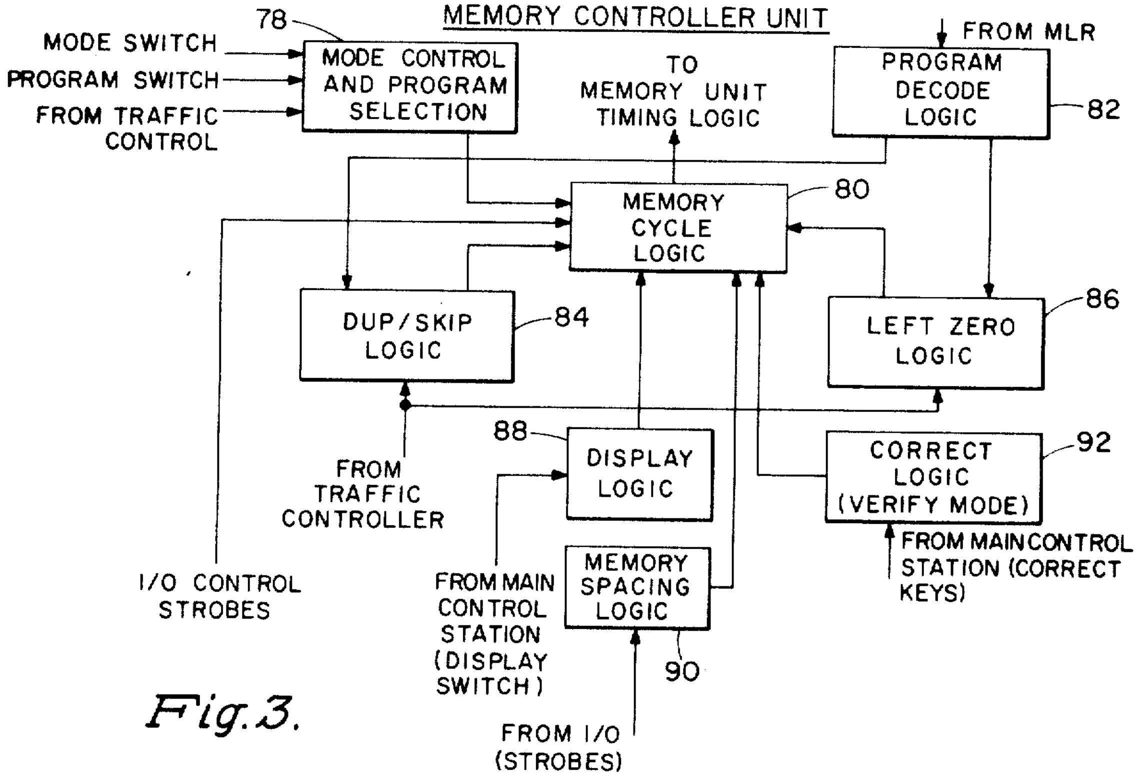
FIG. 3 is a block diagram of the Memory Controller Unit of the system.

FIG. 3 shows a block diagram of the Memory Controller Unit. This unit controls the transfer of data and program information to and from the memory unit and the device control areas. It also detects and performs the automatic memory functions (DUP, Skip, L$\phi$). When an information strobe is received from the I/O bus, the memory cycle logic 80 will cause either a program or data input cycle (PIC or DIC) to begin. This cycle will cause the memory unit to perform the desired operation as initiated by the memory timing logic. Receipt of a data or program request from the I/O bus will cause the start of either a program or data output cycle (POC or DOC) in a similar manner. At the finish of either cycle, the memory controller will allow the traffic controller to generate the appropriate output strobe.

When program information is extracted from memory, the memory controller unit will interrogate the information in the program decode logic 82, looking for an automatic operation code. The existence of an automatic operation code will indicate the beginning of an automatic operation field as a portion of the data record. The automatic data field will be indicated by its most significant character position (MSP) having a program code corresponding to dup, skip or Lϕ. If an automatic MSP is found, the memory controller unit will cause the memory unit to cycle through the particular automatic operation as controlled by logic areas 84 and 86. The display cycling and memory spacing cycling are also controlled by this unit through display logic 88 and memory spacing logic 90. The correct logic 92 is used to change characters and to cause rewriting of the record if an error is detected and corrected in the verify mode.

Mode control and program selection are provided at 78 from operator selectable switches on the MCS control panel.

TRAFFIC CONTROLLER UNIT AND I/O INTERFACE

FIG. 4 shows a logic block diagram of the Traffic Controller Unit. Traffic state sequencer 100 may be a modified 4-bit ring counter which provides four sequentially addressed traffic states (TS1 to TS4). These states are used to control the addressing sequence of the various adapters attached to the I/O bus. Once a traffic state is entered, the state is maintained until the addressed device has completed a full record length operation. Traffic state sequences and their functions in the expanded system (but, for clarity, including only keyboard and tape DCA's) are shown in FIG. 5.

Beginning a cycle will normally cause the system to enter TS2, if in the data entry, search, program entry or program verify modes; and TS1 if in data verify mode. FIG. 5 shows the assigned traffic states for the basic device together with subsequent cycling and use of the traffic state sequencer. For example, if the system is in program entry mode, initialization will cycle the traffic state sequencer to TS2 where the keyboard will become active and stop further sequencing until a record length operation is complete. The operator will then key the program bits into memory. If the mode of operation is program verify, the device will again initialize in TS2 where the operator will again key in the program bits on the keyboard, which bits will be compared with those program bits already contained in memory. Errors in the memory data or the keyed data will be signaled by appropriate alarms.

In data entry mode, the device again will initialize in TS2 wherein the keyboard will be come active and inhibit further sequencing of the traffic state sequencer. When a record length operation is complete, the traffic state sequencer will sequence through TS3, and since no operations are to be performed in TS3 will, after a time-out, sequence into TS4 where the tape DCA will validate its address, and a record will be read from memory onto tape.

In data verify mode, the device will be initialized in TS1. The tape DCA will recognize TS1 as its active state in verify mode, and a record will be read from tape into memory. The traffic state sequencer will then sequence to TS2 and the keyboard will recognize its active state and inhibit further sequencing until the operator keys in source data bits. A comparison is made between the record read in from tape and the data keyed in by the operator. At the end of a record, the sequencer will sequence through TS3 and TS4 where the corrected information is read onto the magnetic tape in place of the defective record.

In search mode, the device will again be initialized in TS2 wherein the operator will key in a record identifier, the remainder of the record being automatically filled with blanks. The device will then be sequenced through traffic states 3 and 4 to TS1 wherein records are sequentially read from tape and compared with the keyed in record identifier until a comparison is reached, at which point the operation will halt.

FIG. 6 is another representation of the traffic state applications as in FIG. 5, but further including the functions of various DCAs. It should be recognized that the system is not limited to the particular DCAs herein presented, and that these are merely examples of operations which may be performed.

In the reading of FIG. 6, it should be noted that three data paths are possible, as follows:

DPA - one input device to memory.

DPB - memory to a number of output devices.

DPC - one input device to a number of output devices.

Note that in traffic state 1, the only acceptable data path is data path A wherein one input device may input information to memory. Shown for purposes of illustration are magnetic tape, card reader and paper tape reader input devices.

Traffic state 2 has two permissible data paths A and C and representative operations are keyboard input and communications input.

Traffic state 3 has three permissible data paths, A, B & C, and typical operations would be the page printer output and the buffered line printer output.

Traffic state 4 has only one permissible data path, that of memory to a number of output devices. Typical examples of output DCA's which will recognize TS4 as their active state are the magnetic tape output, communications output, and paper tape outputs.

Referring again to FIG. 4, when an address strobe (TCADS) is issued by the traffic controller from 102, the active traffic state (TS1 – TS4) will cause a corresponding I/O multifunction line (contained in the I/O bus) to be active through address logic 103. If a DCA with this address is attached, and in the "on" state, it will activate the address valid line (ADV) before TCADS times out. This will prevent the traffic state sequencer from giving an increment. The ADV line is terminated in the start and traffic state control logic 104. The start function is generated on the auxiliary control station control panel and is also applied to the start and traffic control logic 104. When the DCA has processed a full record of information, it will deactivate ADV, and the traffic state sequencer will increment and issue a new address TCADS. If the ADV line is inactive when TCADS times out, an immediate increment to the next traffic state will result and the next address will be issued.

The I/O interface detects all DCA generated strobes except ADV at 106 and decodes the multifunction lines for control information in control information coding logic 108. Output strobes are also generated as specified by the memory controller unit (FIG. 3), and the multifunction lines are coded with output data and control information, both in the control information coding logic 110.

The multifunction line driver/receivers are indicated at 112 and are connected to the I/O bus. FIG. 7 is a schematic representation of the driver and receiver arrangement for one line of the bus, the drivers and receivers being located in the CCU 112 and each of the DCAs 114. There are a plurality of driver-receiver pairs, one for each line of the bus. The lines are terminated at each end by a characteristic impedance, not shown.

THE I/O BUS

The I/O bus connecting the CCU and the DCAs is a daisy-chained, multiple-line, serial bus. All external controls and data transfer between the DCAs and the CCU are conducted through the I/O bus.

FIG. 8 is a graphical representation of the I/O bus lines and functions. The bus cable as described, contains a total of 25 lines.

The I/O bus lines may be divided into 3 categories:

A. Strobe lines (6)

B. Bidirectional multifunction lines (9)

C. Special purpose function control lines (10).

The strobe lines and bidirectional multifunction lines are employed to interchange control commands, program information, and input or output data to and from the system memory. The special purpose function control lines are used to provide interchange of information with the CCU which is required in a continuous nature throughout the input and output operations.

The six strobe lines are used to maintain I/O timing and to gate and control the multifunction lines. Two of the lines BIS (bidirectional information strobe) and ADS (address strobe) are single line functions, whereas the other four lines OPS (output program strobe), IPS (input program strobe), OCS (output control strobe) and ICS (input control strobe) are dual line functions that require two lines together to activate a strobe function. The dual line functions make possible six control conditions, three input and three output.

The nine multifunction lines are all bidirectional and each may have both a driver and receiver circuit attached to them in the CCU interface and in each of the DCA interfaces as previously described.

Referring again to FIG. 8, a matrix or an array is shown at the upper portion of the table setting forth the relationship between the multifunction lines FO1 through FO9 and the six strobe lines previously mentioned. The data or control information to be carried on function lines FO1 through FO9 is determined by the state of the six strobe lines. The bottom portion of the table shows the ten single function lines.

The following is a listing of all combinations of strobe and multifunction lines and the single function special purpose lines, with their mnemonics and functions.

Bidirectional Information Strobe (BIS)

This strobe line may be issued by either the CCU or DCA, to signify data transfer. Upon actuation of this strobe line, the functions of the multifunction lines will be as follows:

| | | |
|---|---|---|
| Line 1 | FO1 Data Bit 1 | |
| Line 2 | FO2 Data Bit 2 | |
| Line 3 | FO3 Data Bit 3 | |
| Line 4 | FO4 Data Bit 4 | |
| Line 5 | FO5 Data Bit 5 | |
| Line 6 | FO6 Data Bit 6 | |
| Line 7 | FO7 Data Bit 7 | Only in 9 Channel Devices |
| Line 8 | FO8 Data Bit 8 | |
| Line 9 | FO9 Data Parity | |

Address Strobe (ADS)

This strobe may only be issued by the CCU and signifies address information.

| | | |
|---|---|---|
| Line 1 | AD1 | |
| Line 2 | AD2 | Address determined by Traffic State. |
| Line 3 | AD3 | |
| Line 4 | AD4 | |
| Line 5 | | |
| Line 6 | | Unused |
| Line 7 | | |
| Line 8 | | |
| Line 9 | TMF | Tape Mark Found — This line is activated along with AD3 and 4 when a tape mark (T.M.) has been detected. It informs any device in Traffic State 3 (TS3) that a T.M. has been found, and to ignore its address but perform any special T.M. function it may wish. (e.g. the line printer will do a "Head of Form" command to inform the operator of the tape mark). |

Output Program Strobe (OPS) and Output Control Strobe (OCS)

These two strobes are coded to arrive at three usuable code sequences. These, together with their multifunction line mnemonics and functions, are:

a. $OPG = OPS \cdot \overline{OCS}$ (CCU to DCA)

| | | |
|---|---|---|
| Line 1 | PB1 ) | |
| Line 2 | PB2 ) | |
| Line 3 | PB3 ) | Program Bits from Memory |
| Line 4 | PB4 ) | |
| Line 5 | PB5 ) | |
| Line 6 | PRL) | Program Mode or No Program Selected — This line is sent to the DCA's to inform them to ignore the first 5 lines. |
| Line 7 | TER1 | Terminate 1 — Informs the DCA that the CCU has reached the end of memory. Used to check block lengths. DCA must finish operation or signal error at this point. |
| Line 8 | TER2 | Terminate 2 — Informs the DCA that memory location 81 has been reached. DCA may legally end operation here. Used for reading cards into memory less than 80 char., or for 80 character headers and trailers in communications systems. |
| Line 9 | ERO | Error Out — Normally informs DCA that last input data character had a parity error. DCA should respond accordingly. Also used in High Speed Communication System to inform communicator DCA that tape write error has occurred. In this case it is issued along with first program following ADS strobe. |

b. $OCG = \overline{OPS} \cdot OCS$ (CCU to DCA)

| | | |
|---|---|---|
| Line 1 | TMD | Tape Mark Defined — Informs DCA that CCU has detected a T.M. issued in place of OPS on first program request. DCA should perform internal tape mark operation. |
| Line 2 | TRB | Tape Record Bypassed — Informs DCA that Tape DCA couldn't read a record and has bypassed it. Communicator DCA will substitute a record of blanks for bypassed record. Issued in place of first program. |
| Line 3 | EOD | End of (Tape) (File) — Undefined |
| Line 4 | TAK | Tape Acknowledge — Acknowledges that TBS or TEF |

| | | |
|---|---|---|
| | | has taken place. Used in High Speed Communicator automatic error recovery. |
| Line 5 ) | | |
| Line 6 ) | | |
| Line 7 ) | Unused | |
| Line 8 ) | | |
| Line 9 ) | | |

c. OCD = OPS·OCS (CCU to DCA)

For purposes of this disclosure, OCD is not utilized.

Input Program Strobe (IPS) and Input Control Strobe (ICS)

The above two strobes are coded to arrive at three usable code sequences. These, together with their multifunction line mnemonics and functions are:

a. IPG = IPS·$\overline{\text{ICS}}$ (DCA to CCU)

| | | |
|---|---|---|
| Line 1 | PRQ | Program Request — Request that the next program be sent to the DCA. Absence of PRQ when IPS is valid is a data request. |
| Line 2 | IDP | Inhibit Auto-Dup — Prohibits Auto-Dup operations for the entire traffic state. Must be sent with first IPS after ADS. May be sent with ever IPS. |
| Line 3 | ALP | Alternate Program — Requests that the block be handled using the secondary program (the one not selected on the main control station). Used to transmit the first block in communications. |
| Line 4 | BUR | Burst Mode — Causes an increased transfer across the bus by effectively skipping the program cycle. Necessary for worst-case type read operations. |
| Line 5 | VER | Verify — Sent with AGN to inform the Traffic Controller that the tape DCA will backspace and read the record just written. Sent in answer to TER1 when writing a record. |
| Line 6 | AGN | Again — Sent to cause a recycling to the beginning of a traffic state. Used for communications, retransmission, or for tape backspace and compare cycle. |
| Line 7 | ISP | Inhibit Auto Skip — Prohibits auto-skip operations for the entire T.S. Must be sent with first IPS after ADS. May be sent with every IPS. |
| Line 8 | Unused | |
| Line 9 | Unused | |

b. ICG = $\overline{\text{IPS}}$·ICS (DCA to CCU)

| | | |
|---|---|---|
| Line 1 | ERR | Error — Indicates that DCA has had an error and that disconnect or processing has ended. CCU will stop with memory address register location displayed, sound the audible alarm, and illuminate the check indicator. |
| Line 2 | MIN | Memory Increment — Used to increment the memory address without entering data. |
| Line 3 | MDC | Memory Decrement — Used to decrement the memory address without entering data. |
| Line 4 | DUP | Dup Key Entry — Presently keyboard only Causes same action as Dup Key depression in basic device. |
| Line 5 | SKP/REL | Skip or Release Key — Causes same action as Skip Key depression in basic device. Release key also causes skip cycle if not at memory maximum. |
| Line 6 | LZK | Left Zero Key — Presently keyboard only. Causes same action as L0 Key depression in basic device. |
| Line 7 | TMW | Tape Mark Write — Informs CCU to place a Tape Mark Record on Tape. |
| Line 8 | REW | Rewind — Causes a tape rewind to take place (same as if or and REW keys are deprssed). |
| Line 9 | RLK | Release — Causes a release cycle to take place (same as if REL key is depressed). |

c. ICD = IPS·ICS (DCA to CCU)

| | | |
|---|---|---|
| Line 1 | TBS | Tape Backspace — Causes a tape backspace over one record to take place (same as if TBS key is depressed). No initialize is necessary if used on bus. |
| Line 2 | TEF | Tape Erase Forward — Causes tape to be erased for 12 inches. (same as if the TEF key is depressed). A device initialized (DIN) must follow this command. |
| Line 3 | | |
| Line 4 | | |
| Line 5 | | |
| Line 6 | | |
| Line 7 | | |
| Line 8 | | |
| Line 9 | | |

Unidirectional Special Purpose Lines a. ADV - ADDRESS VALID

The Address Valid Line originates in the DCA's. When a DCA is active (ON) and ADS is detected with the correct FO1–4 line, the Address Valid Line is activate in response. This line will maintain the traffic controller in its traffic state until deactivated. The DCA will deactivate ADV when a full record length operation has been completed with no retransmission or error correction operations needed.

b. INT - INITIALIZE

The Initialize line is originated in the CCU. It is activated when the ER and HOME keys are depressed on the main control station, or when the reset button on the ACS is depressed. When INT is activated, all attached DCA's are cleared and reset to their initial states. They may be immediately readdressed.

c. PDA - TIMING

The PDA originates in the CCU and is sent to the DCA's to enable them to maintain timing without adding a full clocking system.

d. D1T - DEVICE TRANSMITTING

This line, originating in the DCA's informs the CCU that an output device is active, and that the keyboard must be deactivated. This line is also used to activate interlock conditions to prevent operations which would tend to destroy information on tape. It is active in all traffic states.

e. D1R - DEVICE RECEIVING

This line, originating in the DCA's, informs the CCU that an input device is active, and that the keyboard must be deactivated. This line is also used to activate interlock conditions to prevent operations which would tend to destroy information on tape. It is active in all traffic states.

f. DIN - DEVICE INITIALIZE

This line, originating in the DCA's, enables a DCA to initialize the CCU. It acts upon the CCU as if the ER-HOME keys were depressed. However, INT is not activated on the bus.

g. TSM - TRAFFIC STATE MODIFY

This line, originating in the DCA's will cause the CCU to go directly to TS1 when the START button is depressed in write mode. This is necessary for use with the paper tape reader DCA.

h. HSC - HIGH SPEED COMMUNICATIONS ACTIVE

This line, originating in the DCA's, activates various automatic error recovery logic used in the HSC system.

i. WMD - WRITE MODE

This line, originating in the CCU, informs the DCA that the CCU is in write mode. It is used mainly for interlocking against undesired operations.

j. VMD - VERIFY MODE

This line, originating in the CCU, informs the DCA that the CCU is in verify mode. It is used mainly for interlocking against undesired operations.

TRAFFIC CONTROLLER, TRAFFIC STATE SEQUENCER AND ADDRESS CONTROL

Figure 9A:
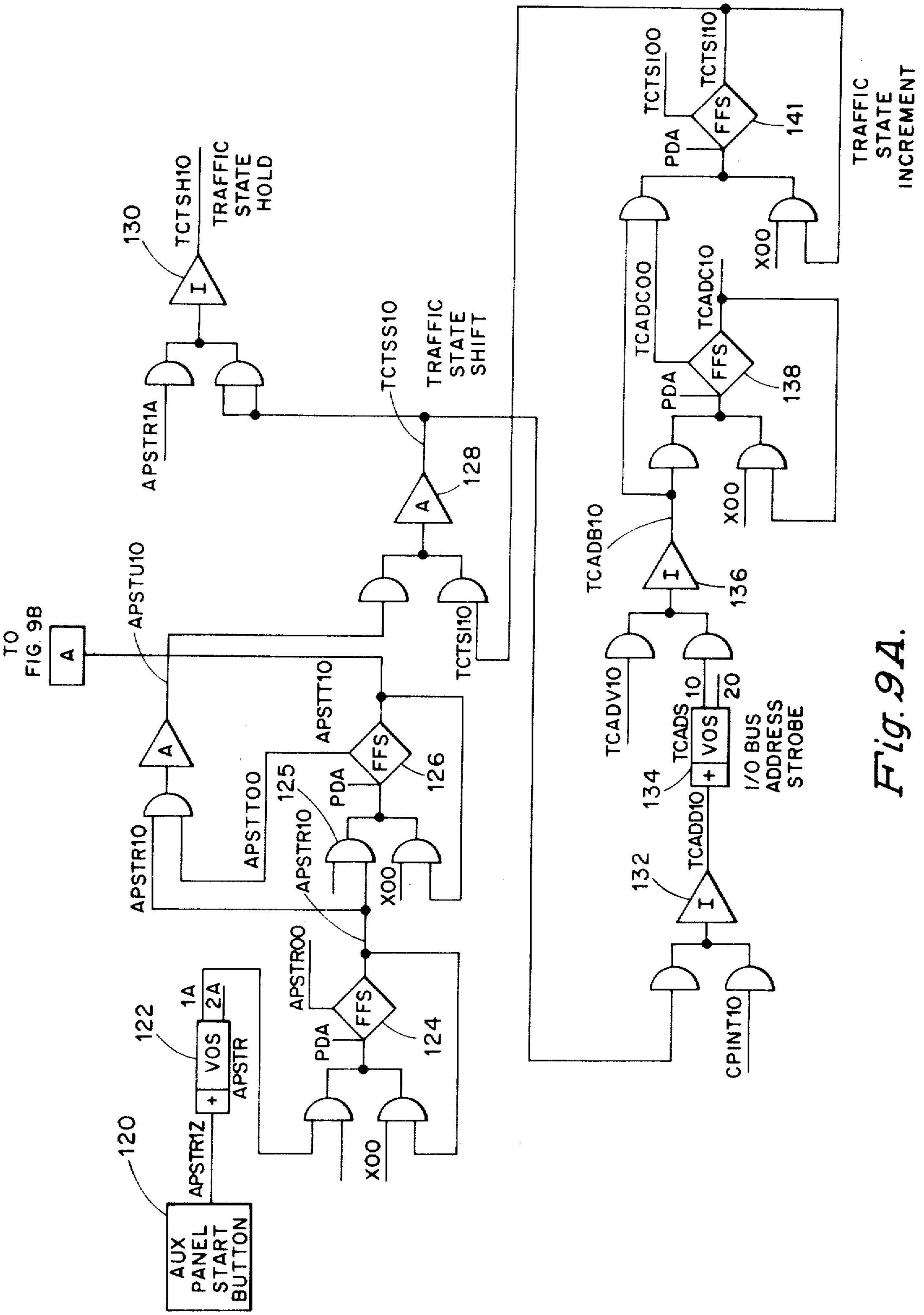
FIGS. 9A and 9B are logic block diagrams of the traffic state sequencer.
Figure 9B:
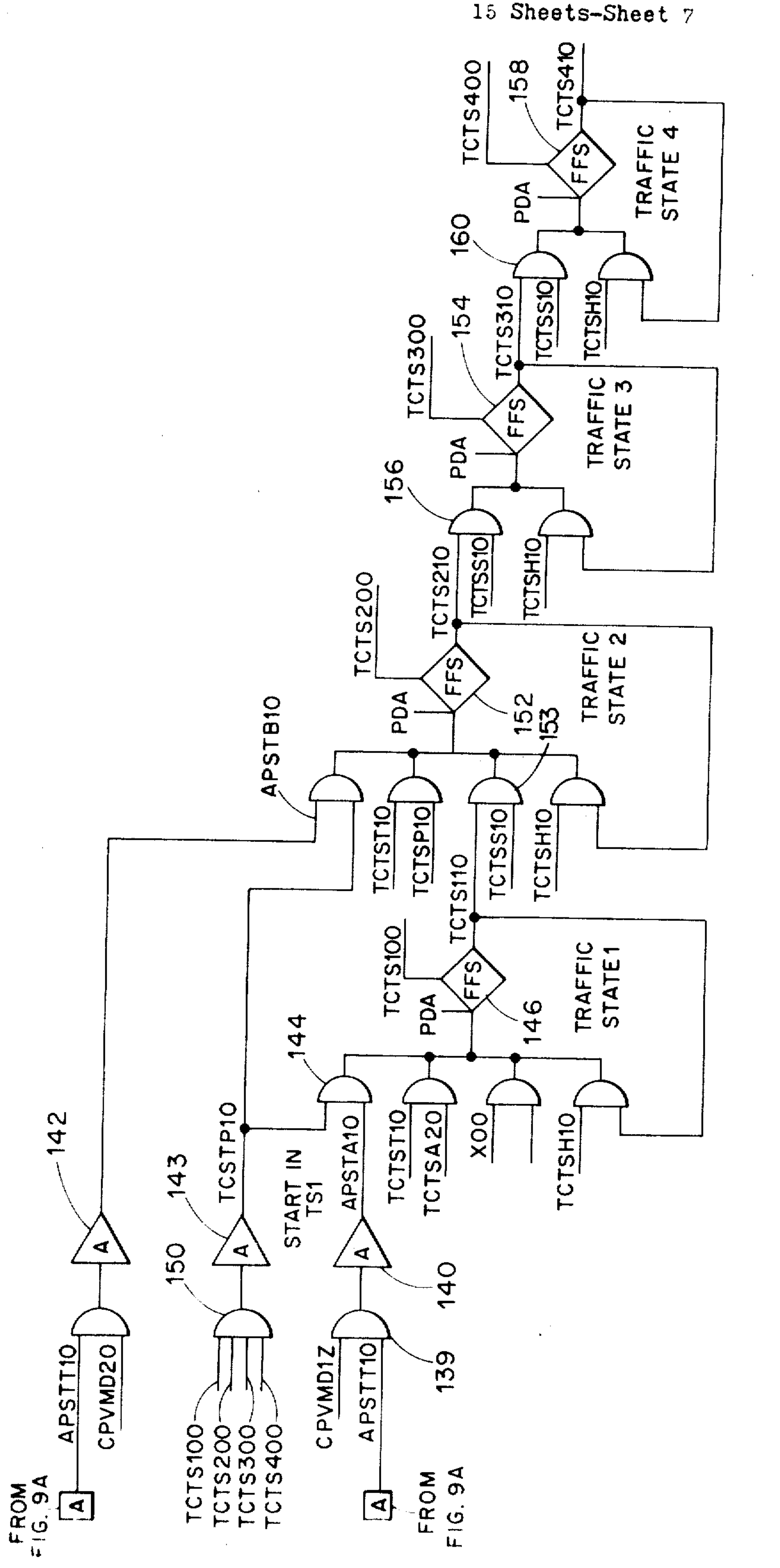

FIG. 9 including FIGS. 9A and 9B, shows a logic block diagram of the traffic state sequencer and address control, the general functions of which have been previously discussed with reference to FIG. 4.

As an aid to the understanding of the timing of the traffic state sequencer and address control, reference will be made to FIG. 10 which shows start-up and address timing.

In general, the traffic state sequencer is comprised of a chain of four synchronous flip-flops synchronized with a general clock (not shown) which develops a pulse PDA. As previously indicated, the sequence is started in either traffic state 1 or traffic state 2 depending upon the mode of operation of the device. Normal operation begins in traffic state 2, but if the device is in verify mode, VMD, starting will place the sequencer in traffic state 1.

Upon depression of the start button 120 located on the auxiliary panel of the auxiliary control station unit (42 in FIG. 1), a pulse APSTR1Z is generated, which pulse is applied to a variable one shot multivibrator 122 which triggers on the leading edge of the start pulse. The one shot 122 develops a pulse APSTR1A of a fixed duration. This pulse is applied to an input gate 123 of a sync-flop 124 which will set on the next PDA. An output of sync-flop 124 (APSTR10) is applied as an input to an AND gate 125 controlling a sync-flop 126. At the same time, APSTR1A is applied to the other input of the AND gate 125, and sync-flop 126 is set on the next PDA, generating APSTT10. (It should be noted that throughout the description of the logic block diagrams and timing sequences of the various units, that the first two letters of the pulse define the origin of the pulse, i.e. AP is an auxiliary panel pulse, TC is a traffic controller pulse, MM is main memory, MC is memory controller, etc).

The output of sync-flop 124, APSTR10, is applied through an amplifier 127 to the input of an amplifier 128 which generates TCTSS10, the traffic controller traffic state shift signal. TCTSS10 is applied to the input of an inverter 130 from which is developed TCTSH10, the traffic state hold signal, which is normally high and is lowered upon application of TCTSS. The function of TCTSH10 will be discussed later. TCTSS10 is also applied to another inverter 132 from which is derived TCADD10, which signal, normally high, is used to trigger a 10 microsecond variable one shot 134, to produce TCADS on the positive-going edge of TCADD10. TCADS10 is the address signal defined with reference to FIG. 8, which will be strobed with one of the multifunction lines to create a traffic state address which is sent along the bus to the DCA's.

TCADS10 is further applied to an input of inverter 136 from which TCADB10 is generated. TCADB10 is normally high and goes low upon application of TCADS10. TCADB10 is applied as one input to sync-flop 138 and as one of a pair of ANDed inputs to sync-flop 140. Sync-flop 140 is reset immediately upon application of TCADB10, which goes low, and TCADC00 (which is high at this point), to generate TCTSI10. On the next PDA pulse, TCADC10 is driven low by the resetting of sync-flop 138.

If, before TCADS10 times out (10 μsec), TCADV is raised by a DCA recognizing its traffic state, TCADB10 will remain low and inhibit generation of TCTSI10, and, ultimately, TCTSS10, to prevent a traffic state shift and lock the sequencer in its then-current traffic state until TCADV is released by the DCA at the completion of the DCA's operation (usually a one record-length operation).

APSTT10 is applied both to amplifier 140 and amplifier 142 via input gates (FIG. 9B. The inputs of amplifiers 140 and 142 are ANDed with CPVMD signals to determine whether the device will enter traffic state 1 or traffic state 2. If CPVDMIZ is present (high), the device is in verify mode and AND gate 139 will produce a signal at the input of amplifier 140 to generate APSTA10. With APSTA10 present on AND gate 144 and TCSTP10 having been generated at the output of amplifier 148 and formed by the negation of all traffic state outputs (which at the device initialize stage are all high), sync-flop 146 will be set on the next PDA pulse. The output TCTS100 of sync-flop 146 will now go low thus removing signal TCSTP10. TCTS110 will be high, and is fed back to AND gate 152 whose other input TCTSH10 is also high due to the absence of TCTSS10 and APRST1Z on inverter 130 (FIG. 9a). The device will therefore remain in traffic state 1 until TCTSH10 goes low upon initiation of a traffic state shift as will be later described.

If the device was not initially in verify mode, CPVMDIZ will be low thus not allowing sync-flop 146 to set. Instead, the negation of CPVMDIZ, CPVMD20 will be high, and this signal ANDed with APSTT10 will generate APSTB10 through amplifier 142. Again, TCSTP10 will be high thus setting sync-flop 152 on the following PDA pulse, and TCTS2 will be generated and held by TCTSH10 until a traffic state shift signal is generated.

It can be seen that, if the device has been initialized in traffic state 1, the appearance of a traffic state shift signal TCTSS10 and the concurrent release of TCTSH10, will cause through AND gate 153 the setting of sync-flop 152 on the next PDA pulse. When the traffic state time period is completed in traffic state 2, a traffic state shift signal TCTSS10 together with TCTS210 will set sync-flop 154 through AND gate 156. Release from traffic state 3, will, in a like manner, set sync-flop 158 through AND gate 160. TCTSI10 is generated, as previously discussed, by release of ADV by a DCA.

While each of the traffic states is generated, the TCTS110, TCTS210, TCTS310 or TCTS410 signal will be applied to lines F01, F02, F03 or F04, respectively, of the nine multifunction lines. Together with the TCADS10 address strobe as previously described, this generates a unique address for any one traffic state.

Figure 11A:
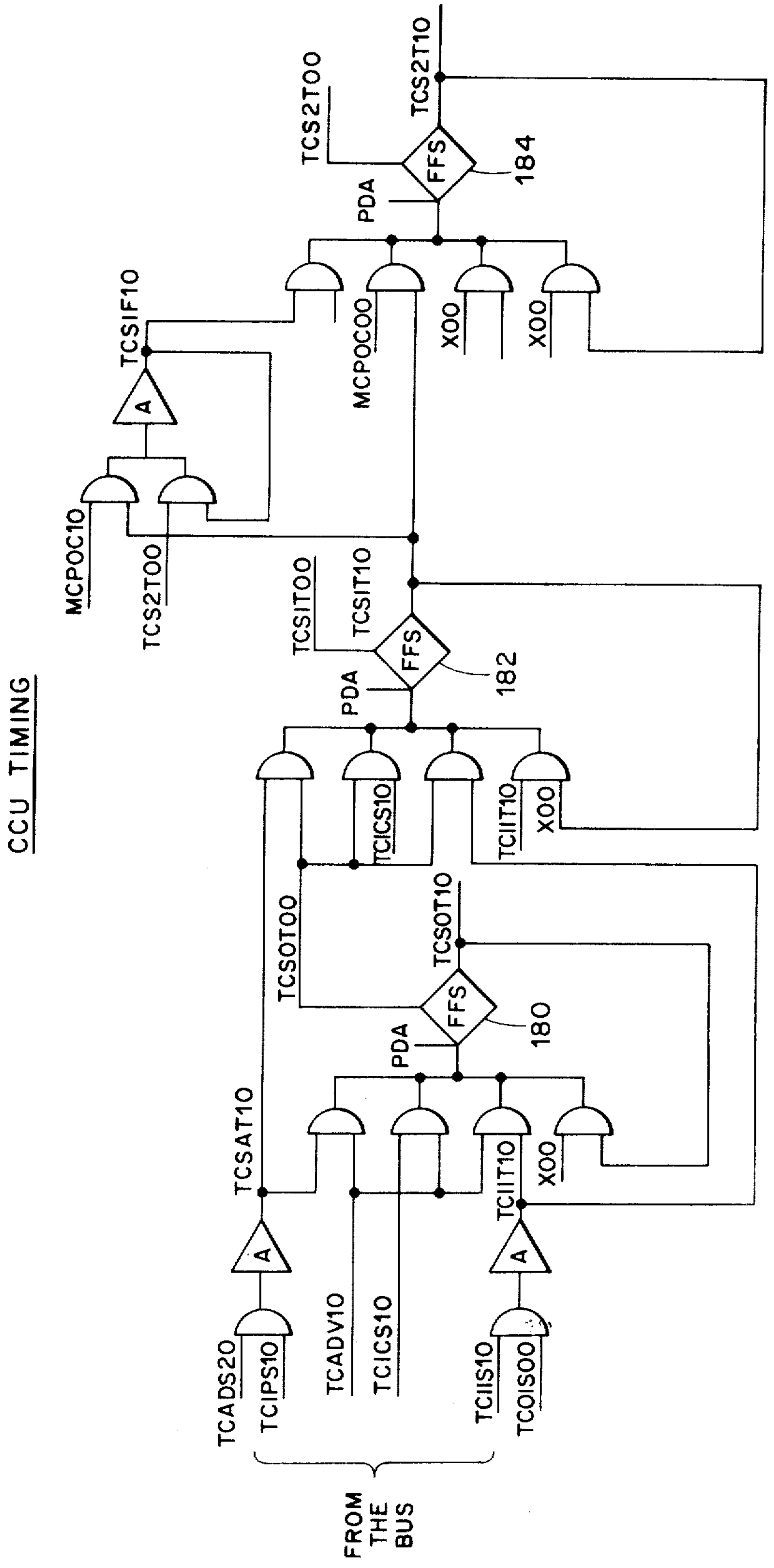
Figure 12A:
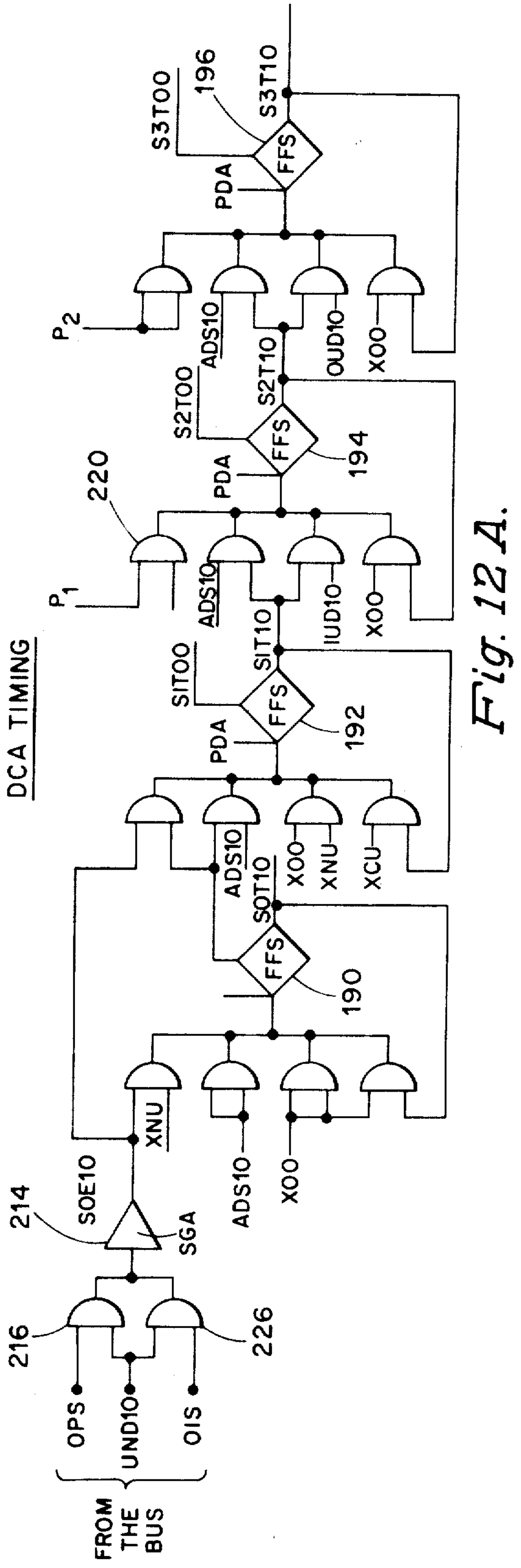
FIGS. 12A to 12H are logic block diagrams of a DCA's timing and strobe generation.
Figure 12B:
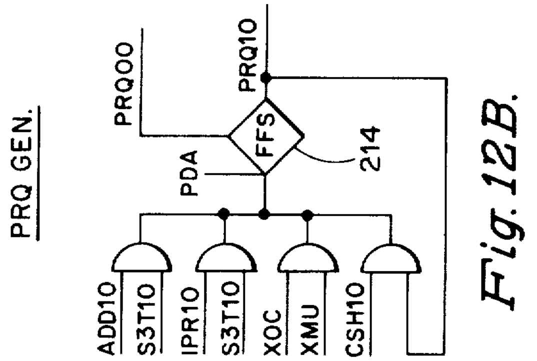
Figure 12C:
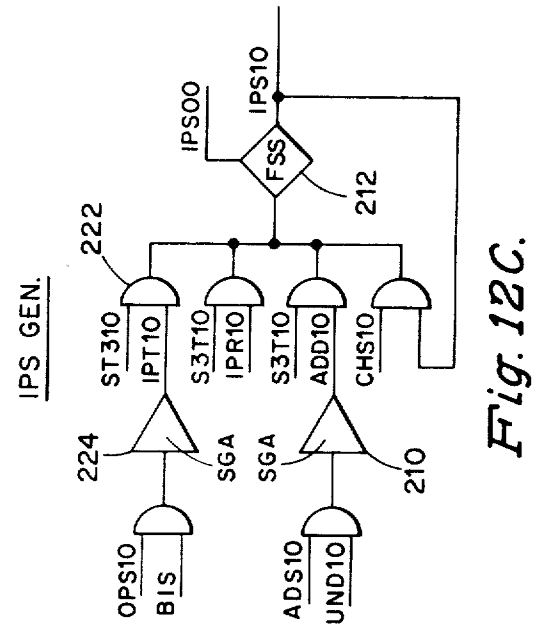
Figure 12D:
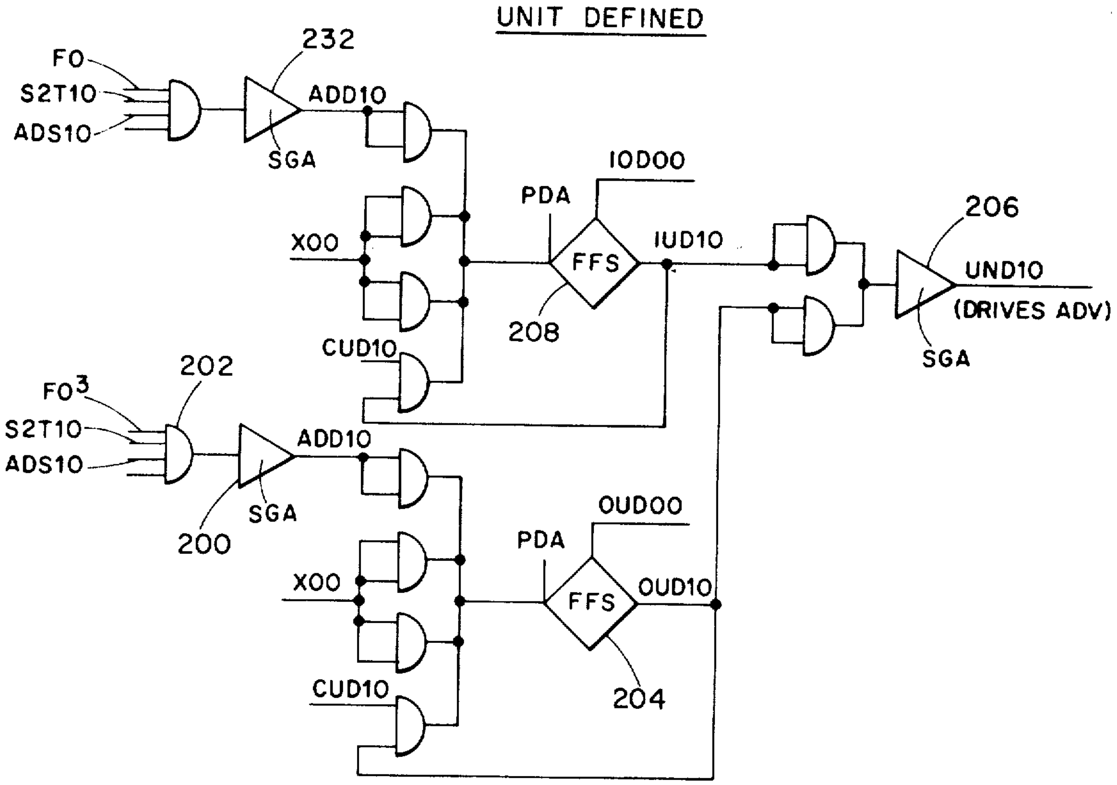
Figure 12E:
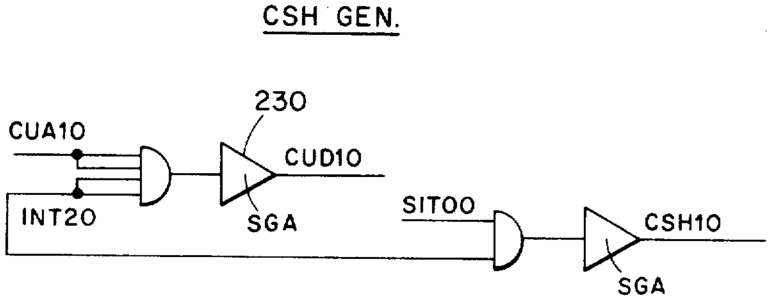
Figure 12F:
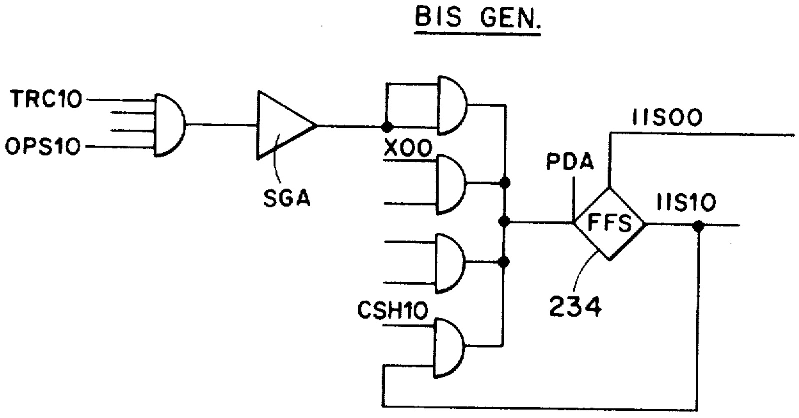
Figure 12G:
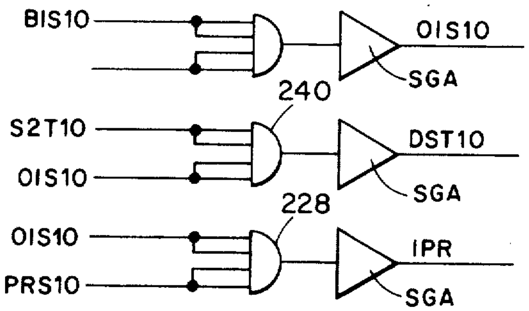
Figure 12H:
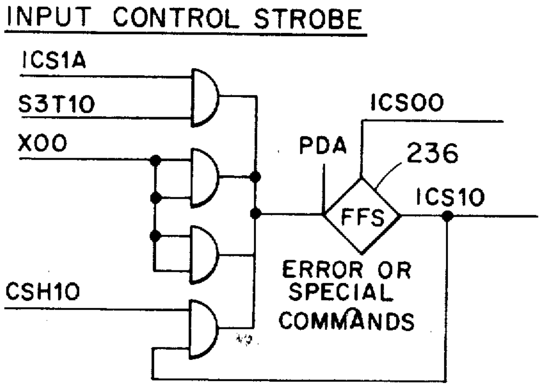

As can be seen, the internal timing of the various logic units is synchronous, in that they are timed by a central clock in the CCU. The bus timing itself, however, is asynchronous in that a signal initiated in the CCU is held until accepted by a DCA, and signals generated in the DCA are held until accepted by the CCU. This being the case, each unit (CCU and DCA's) must have a means for generating timing strobes responsive to strobes initiated in the other unit. To this end, the traffic controller unit contains a timing generation unit as shown in FIG. 11A. Upon receipt of various combinations of signals from the bus which originate in the DCA, sync-flop 180 is set on the next PDA pulse following the receipt of strobes from the DCA. The setting of sync-flop 180 ultimately causes the setting of sync-flop 182 to generate the signal TCS1T10. TCS1T10, in turn, generates TCS2T10 by causing the setting of sync-flop 184. The origin and timing of the CCU strobes will be covered later in conjunction with the timing and strobe generation of the DCA's. FIGS. 11B, C, D and e show CCU strobe generation circuits which also will be discussed later.

DCA Timing and Logic

FIGS. 12A through 12H show the internal timing and strobe logic of a typical DCA unit. Although the specific logic shown is not mandatory, the signals generated therein must be generated by any DCA logic used. Obviously, with various types of attachments, some specialized signals will have a additionally be generated. Since the specific attachments form no part of the instant invention, discussion of all the strobes and signals shown in FIG. 8 is not necessary, it being recognized that many of them are special purpose signals useful in only one or two types of attachment. As a result, the discussion of the operation of the unit will relate only to those strobes and signals which are generally necessary to the operation of the I/O bus configuration in the expanded system. For use with specific I/O devices, it would be obvious to a skilled logician, in view of the disclosure herein presented, to provide the necessary control functions.

As with the traffic controller, the DCA contains a timing section to generate timing signals internal to the DCA. Again, the timing is synchronous in that synchronous flip-flops are used, which flops are fired on the next PDA pulse following actuation of its input gate. Flip-flop 190 (FIG. 12A) generates the first timing command in the DCA board, SOT10. SOT10 in combination with other signals, fire sync-flop 190 to generating S1T10, which in turn sets sync-flop 194 to generate S2T10 which finally sets sync-flop 196 to generate S3T10. The other logic block sections appearing in FIG. 12 will be discussed in conjunction with the overall operation of a typical device attachment and with the traffic state generation and traffic controller timing and strobe generation.

OVERALL OPERATION OF THE DEVICE

Output DCA

Figure 10:
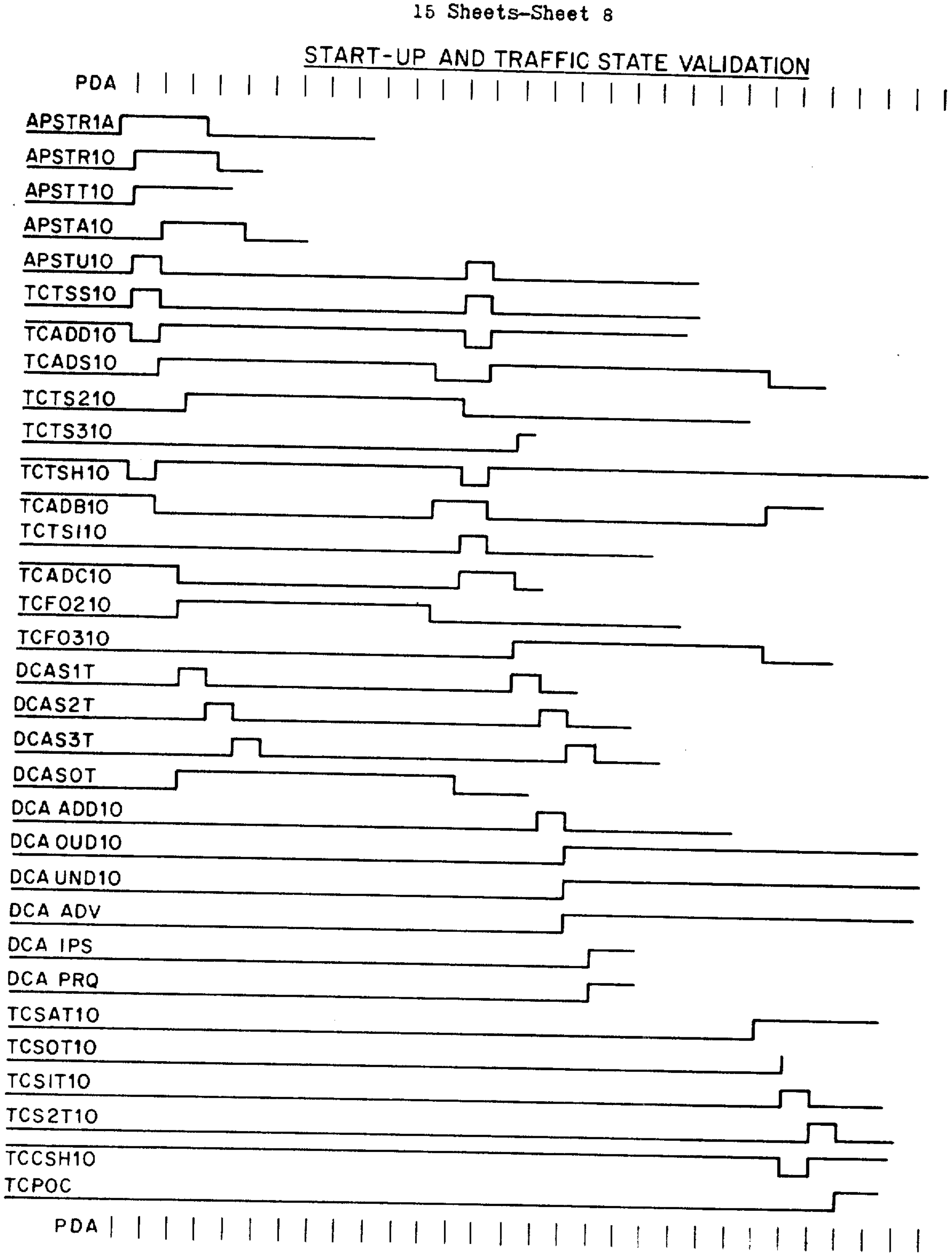
FIG. 10 is a timing diagram showing start-up and traffic state address validation.
Figure 13:
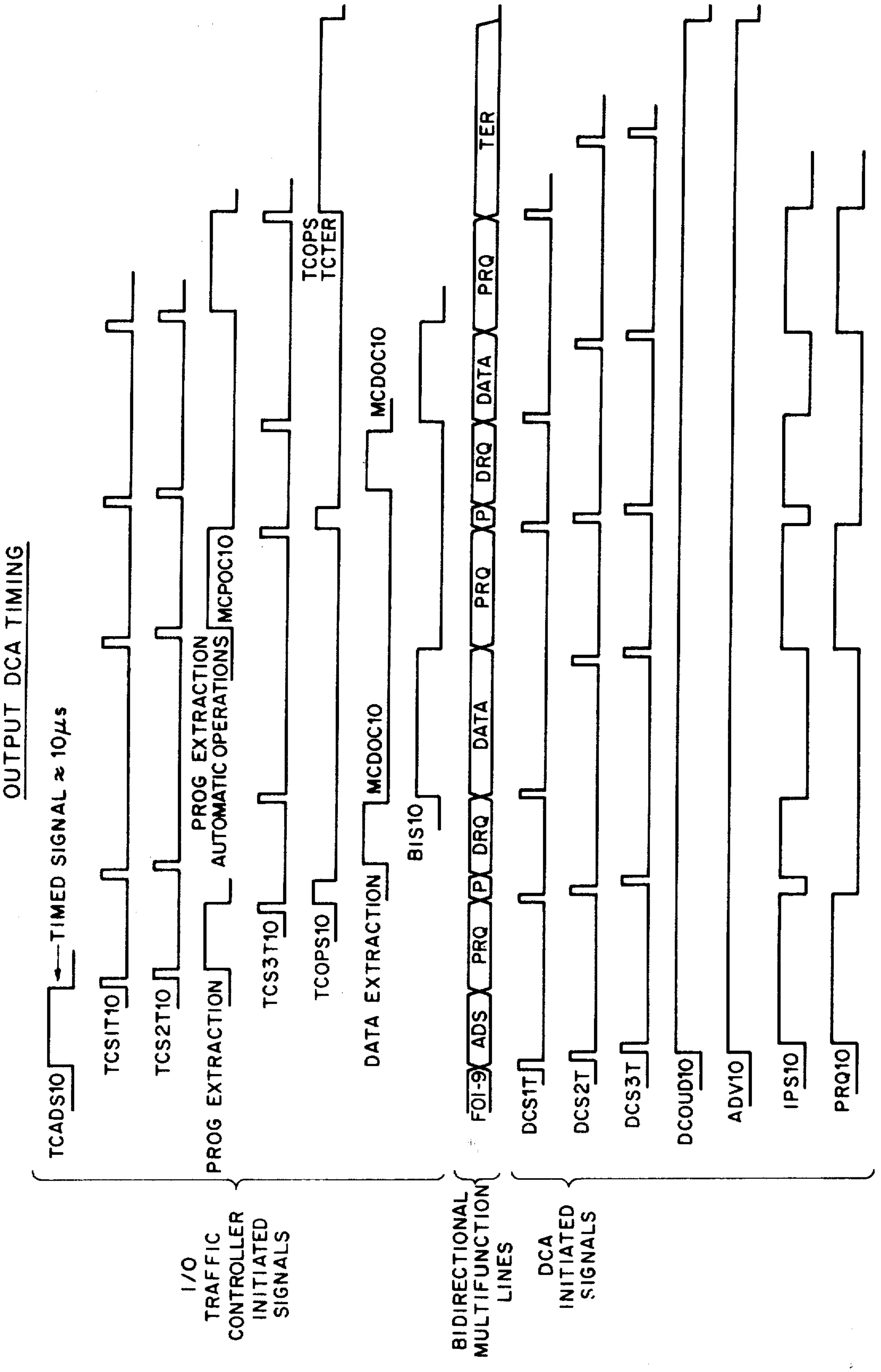
FIG. 13 is a timing diagram depicting a record-length operation of a typical output DCA.
Figure 14:
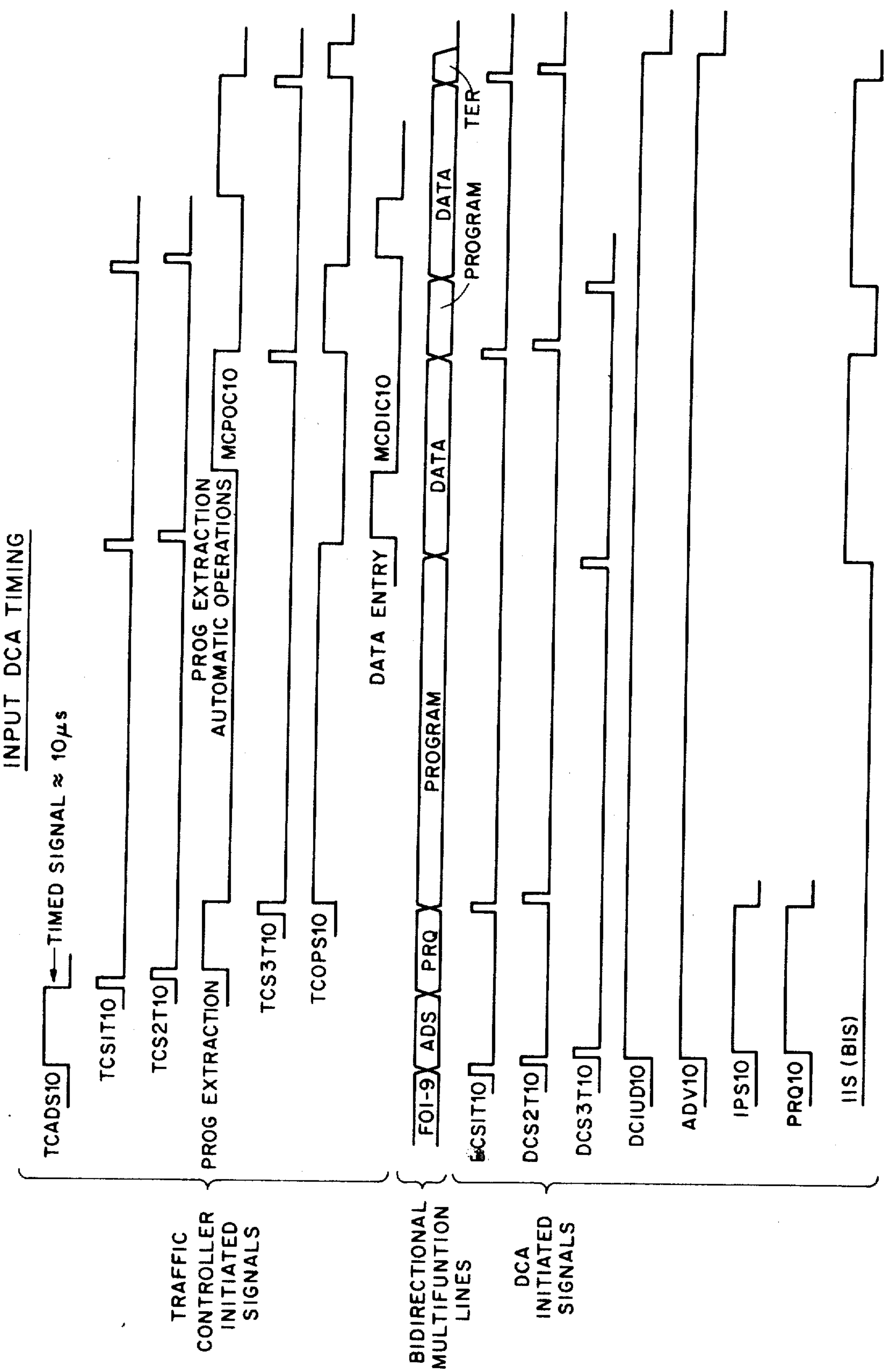
FIG. 14 is a timing diagram depicting a record-length operation of a typical input DCA.

In the discussion of the operation of the expanded unit with a typical output DCA, reference may additionally be made to the timing diagram of FIG. 10 and the timing diagram of FIG. 13, FIG. 10 showing start-up and address validation and FIG. 13 showing a less detailed timing diagram of a complete record-length operation. Initial operations are begun by the operator selecting the appropriate DCA(s) required for the operation to be performed by means of a switch on the Auxiliary Control Station adapter control panel area. Assuming the device is not operating in verify mode, the traffic state sequencer will enter traffic state 2 as previously described, by setting of sync-flop 152 in FIG. 9B.

When the traffic state is entered, the CCU drives the TCADS strobe line for 10 microseconds along with the FO (multifunction) line corresponding to the traffic state. In this example, TCADS and FO2 will be driven to generate the traffic state address for traffic state 2. Since traffic state 2 is essentially an input traffic state, the output DCA will not recognize TS2 as its active state. Since no DCA has recognized TS2, TCADS will time out after 10 microseconds and since no ADV (address valid) line is high, the traffic state hold line will go low releasing traffic state 2 and the traffic state shift signal TCTSS together with TS210 will set sync-flop 154 through AND gate 156 to establish the traffic state sequencer in traffic state 3. TCADS is again issued for 10 microseconds but this time with FO3 high, corresponding to traffic state 3. The receipt of ADS10 from the bus immediately sets sync-flop 190 through gate 191 and S1T, S2T and S3T are set for one PDA, sequentially. On S2T10, ADD10 (FIG. 12d) will be set since the ADS, S2T, and FO3 inputs to AND gate 202 are satisfied. The fourth terminal on AND gate 202 may be used to inhibit if desired. For example, if it is desired to lock out a particular DCA, a signal is applied to the inhibit pin. The output DCA of FIG. 12 recognized TS3 as its active state, and activates ADV10 through amplifier 200, the input being determined by the presence of FO3, S2T10 and ADS10 on gate 202.

When ADD10 is satisfied, sync-flop 204 will be immediately set driving a signal OUD10 (output unit defined) high. OUD10 immediately drives UND10 through an amplifier 206. UND in turn drives the ADV or address valid line, one of the single function lines on the bus. Note that had the particular DCA been an input device, the IUD flop 208 would have been set instead of the OUD flop 204. Both flops 204 and 208 will drive amplifier 206 to generate UND10 and ADV. With ADS10 and UND10 high, amplifier 210 (FIG. 12C) is driven and, together with S3T10 will set sync-flop 212 to generate IPS 10. At the same time, the appearance of ADD10 and S3T10 will set sync-flop 214 (FIG. 12B) to generate PRQ10. As can be seen in FIG. 8, the appearance of IPS with PRQ (PRQ being the FO1 line driven high) is a program request which will be transmitted over the bus to the CCU. It should be noted, although it is not essential to the understanding of the instant invention, that if the skip and dup functions are not required, FO2 and FO7 would also be driven with PRQ, by means not shown.

Further action in the DCA now awaits the CCU reply to the program request. After time out of ADS, the CCU recognizes the incoming PRQ signal, enacts a program output cycle to extract the program code from the memory, and places this code on the FO lines of the bus together with OPG. The memory cycles will not be discussed in detail as they may be conventionally carried out in the memory controller and main memory sections of the unit. Since the OPG strobe transmitted by the CCU is $OPS \cdot \overline{OCS}$, the input to amplifier 214 (FIG. 12B) will detect the CCU's OPG strobe. The input of amplifier 214 is controlled by a pair of AND gates ORed together, one of the AND gates 216 being controlled by OPS and UND10 which has remained high as generated by amplifier 206. UND10 will remain high until the entire record is received.

Upon receipt of OPS and UND high, amplifier 214 generates SOE10 which sets SOT10 and S1T10 through sync-flops 190 and 192. S1T resets IPS and PRQ by dropping CHS10, (FIG. 12E), and the incoming program code on lines FO1 through FO5 of the bus may be decoded and utilized if required, by means specific to the particular DCA, not shown.

With the input unit defined flop 208 reset (as it is in this case since the DCA is an output DCA) the timing stops after S1T until the program has been assimilated and a signal is applied to terminal P1 which is an input to AND gate 220 and the output of which is ORed to the input of sync-flop 194. When a signal is applied to P1 to set S2T, S3T will follow on the next PDA pulse on OUD10·S2T10 and with S3T and OPG true IPS will set via AND gate 222 and amplifier 224. If the particular output DCA does not require program information, the P1 signal will be applied on S1T so that S2T and S3T will follow on the next successive PDA pulses, as shown in FIG. 13.

The generation of IPS along on the bus is recognized by the CCU as a data request.

The CCU will initiate a DOC in the memory controller and reply to the data request with a memory column data code on the FO lines and a BIS. The BIS is generated as shown in FIG. 11b upon receipt of commands from the memory controller and main memory unit. BIS is known as OIS when used to output data and is IIS when used to input data. Logic within both CCU and DCA, not shown here, is used to discriminate between these usages.

BIS is received as one input of AND gate 226 which, along with UND10 drives amplifier 214 to produce SOE10, and S1T. S1T again will reset IPS and the data code will be utilized by the attachment, when it is ready. It will accomplish this by again triggering S2T through P1. S2T and OIS will cause the DCA data strobe DST10 (FIG. 12G) by firing gate 240. This will also activate S3T.

With BIS true, AND gates will set IPS and PRQ on S3T and a new program request will be sent down the bus. The above sequence of program request and then data request will be repeated for every column of the memory until a terminate signal (TER) is received.

Two terminate signals are sent out by the CCU. When TER1 (OPS and FO7) is received, the DCA must reset its logic creating CUA10 by conventional means, not shown, and release the ADV line through amplifier 230.

Input DCA

The initial operations with an input DCA will be similar to that of an output DCA. Since TS2 is an input state, when ADS is strobed at S2T, in DCA amplifier 232 (FIG. 12D) will drive sync-flop 208 to generate the input unit defined or IUD signal which in turn will drive amplifier 206 to develop UND10 to activate ADV. IPS·PRQ is again issued and the CCU will return OPS with the first program character. The DCA will fire S1T and S2T but inhibit S3T until the first data character to be transmitted to the CCU is in its register (not shown) ready to be placed on the FO lines of the bus. At this time S3T is allowed through a signal applied at P2 and IIS (the DCA's BIS line) is activated by a data register signal with the data character.

The CCU will detect BIS, reset OPS at S1T by dropping TCCSH10, strobe the data into the MLR at S2T and perform a data input cycle (DIC) placing the data in memory. This is followed by a program output cycle (POC) which extracts the next program and activates OPS with the program character. As can be seen BIS times and specifies the data and serves as an automatic program request.

Operation continues as above until the CCU issues TER to indicate the end of a record again, IUD is reset and ADV deactivated.

The CCU will then increment to TS3, time-out, and increment to TS4 where the received data may be written on tape through the tape DCA which in this case will perform as an output DCA. The Input Control Strobe (ICS) 236 (FIG. 12H) is used when a DCA wishes to send error or special control information to the CCU.

While the invention has been shown and its operation described with a key-to-tape unit, the principles of the input-output bus may be applicable to a variety of other data processing systems. Other modifications of this system will become apparent to those skilled in the art, and the specification is not intended to be limited to that application specifically described.

We claim:

1. A data processing system having a central control unit and a plurality of classes of input and/or output devices, comprising:
   a. an input-output bus having a plurality of lines,
   b. logic means for generating a plurality of traffic states connecting said bus to said central control unit,
   c. at least one of said traffic states being defined as an input traffic state and at least one of said traffic states being defined as an output traffic state,
   d. logic means connecting said bus to said input and/or output devices,
   e. each class of input and output devices being responsive to one or more of said traffic states, and
   f. selection means for enabling one of said devices of each class for transmission or reception of information or control signals carried by said lines.

2. A data processing system as in claim 1 wherein said logic means for generating a plurality of traffic states is a ring counter.

3. A data processing system as in claim 1 wherein said plurality of lines includes at least two groups of lines, said groups being control lines and multifunction lines.

4. A data processing system as in claim 3 wherein said multifunction lines are bidirectional.

5. A data processing system having a central control unit and a plurality of input-output device control area units comprising:
   a. an input-output buss connecting said central control unit and said device control area units, and having a plurality of bidirectional multifunction lines and a plurality of control lines forming an array,
   b. means responsive to actuation of one of said control lines for transmitting data on said multifunction lines between said central control unit and said device control area units, and c. means responsive to actuation of another of said control lines for transmitting commands on said multifunction lines between said central control unit and said device control area units.

6. A data processing system as set forth in claim 5 wherein said array terminates with AND function logic to selectively generate various commands or data on said multifunction lines.

7. A data processing system comprising:

a. a central control unit, b. a plurality of peripheral devices, c. an input-output bus connecting said central control unit with at least one of said peripheral devices for carrying information therebetween, d. a plurality of device control area units, one for each of said peripheral devices, e. said device control area units each containing synchronous timing means, f. said bus information being asynchronously timed with respect to said synchronous timing means.

8. A data processing system as set forth in claim 7 in which said information carried on said bus remains on said bus until released by said synchronous timing means.

9. In a data processing system including a plurality of peripheral devices, a traffic controller comprising:

a. an I/O bus including "*n*" information signal wires and "*c*" control signal wires, the combination of information and control signal wires constituting an array having "*n*" rows and "*c* + *a*" columns, wherein "*a*" is an interger, b. logic means defining a plurality of traffic states, and c. means responsive to AND conditions of said array and to said logic means for controlling execution of an operation.

10. In a system as set forth in claim 9, said traffic controller having four traffic states, traffic states No. 1 (TS1) and traffic state No. 2 (TS2) being essentially input states and traffic state No. 3 (TS3) and traffic state No. 4 (TS4) being essentially output states.

11. A traffic controller as set forth in claim 9 wherein said traffic states are four in number and are defined as follows:

| TS1 | TS2 | TS3 | TS4 |
|---|---|---|---|
| IN | IN | OUT | OUT |
| Tape | Keyboard | Printer | Tape |
| Card | Communications | | Communications |

where tape refers to magnetic or punched tape, communications refers to a communication device such as a modem for transmission or reception of communications, and printer is a line or serial printer; and where IN refers to an input state and OUT refers to an output state.

12. A system as set forth in claim 10 further comprising a record-size memory to hold data entered during TS2, which data may be printed during TS3, and released for recording on magnetic tape during TS4; and verified by reading the data from magnetic tape into memory in TS1 to be compared through re-entry of the data during TS2.

13. A system as set forth in claim 12 wherein verifications may be controlled by immediately entering TS1, and other operations may be controlled by immediately entering TS2.

14. In combination: a bus having "*n*" data lines and "*c*" control lines constituting rows and columns, respectively, of an information array having "*n*" rows and "*c*+*a*" columns, where "*a*" is an interger, and where each intersection thereof may provide an AND function for addressing or control; a memory; keyboard input means; traffic state control means; a magnetic tape unit; and means for translating the information array signals into operations for releasing data entered through said keyboard onto said tape and for the reading of information on tape into said memory for verification; all under control of said traffic state control means.

15. The combination as set forth in claim 14 where "*n*" = 7.

16. The combination as set forth in claim 14 wherein "*n*" = 9.

17. The combination comprising: a magnetic tape unit; a record memory; a keyboard; an output unit; means for establishing a first traffic state during which time said tape is read into said memory; means for establishing a second traffic state during which time said keyboard is read into said record memory; means for establishing a third traffic state during which time said output unit is caused to operate; and means for establishing a fourth traffic state during which time said record memory is released to said tape unit for recording the information in said record memory onto said tape.

18. An input-output control device comprising:

a bidirectional input-output bus including "n" data lines and "c" control lines;

a traffic controller for sequentially establishing a plurality of traffic states TS1, TS2, TS3, and TS4, and for establishing signals in response to said traffic states; and logic means for routing said traffic state signals to all devices to be controlled by the use of a control line ADS and a plurality of data lines FO1, FO2, FO3 and FO4 each corresponding respectively to one of said traffic states.

19. A keyboard to magnetic tape system comprising: a record memory; first logic means responsive to a data verify control signal for producing a TS1 traffic state signal for controlling the reading of a magnetic tape into said record memory; second logic means for producing a TS2 traffic state signal for all non data verifying operations, said second logic means including logic for controlling the keyboard operation of said system; and third logic means for establishing traffic states TS3 and TS4 to thus provide printing output and tape output operations respectively.

20. A keyboard to magnetic tape unit having means for reading a magnetic tape and means for recording onto said magnetic tape comprising:

a. first logic means for establishing a plurality of traffic states including at least one input state and one output state, b. a bus having "*n*" information lines and "*c*" control lines, c. at least one of said control lines designating said information lines for use in transmitting data, and d. at least one of said control lines designating said information lines for use in transmitting signals representing operations.

21. In a data processing system having at least a central control unit, a keyboard entry device, a tape input/output device, a traffic controller and a record memory, the method of recording and verifying records comprising:

a. entering a traffic state TS2 during which a record is entered through said keyboard into said record memory, b. sequencing to TS4 during which said record is transferred to said megnetic tape, c. sequencing to TS1 during which said record is re-entered into memory from said magnetic tape, and d. returning to TS2 to verify the data in said memory by re-entering said record through said keyboard.

* * * * *